United States Patent
Oomen

(10) Patent No.: US 10,912,388 B2
(45) Date of Patent: Feb. 9, 2021

(54) CUSHIONED LOAD BEARING SURFACE AND METHOD FOR MAKING SAME

(71) Applicant: Illinois Tool Works Inc., Glenview, IL (US)

(72) Inventor: Craig M. Oomen, Lowell, MI (US)

(73) Assignee: Illinois Tool Works Inc., Glenview, IL (US)

( * ) Notice: Subject to any disclaimer, the term of this patent is extended or adjusted under 35 U.S.C. 154(b) by 29 days.

(21) Appl. No.: 16/222,523

(22) Filed: Dec. 17, 2018

(65) Prior Publication Data

US 2019/0183249 A1     Jun. 20, 2019

Related U.S. Application Data

(60) Provisional application No. 62/599,137, filed on Dec. 15, 2017.

(51) Int. Cl.
    *A47C 7/14*            (2006.01)
    *A47C 7/02*            (2006.01)
    (Continued)

(52) U.S. Cl.
CPC .............. *A47C 7/144* (2018.08); *A47C 7/027* (2013.01); *A47C 7/20* (2013.01); *A47C 7/35* (2013.01);
(Continued)

(58) Field of Classification Search
CPC .. A47C 7/144; A47C 7/35; A47C 7/20; A47C 7/74; B60N 2/56; B60N 2/72
See application file for complete search history.

(56) References Cited

U.S. PATENT DOCUMENTS 5,595,003 A * 1/1997 Snow ................... A43B 13/181
                                                                    36/27
7,153,560 B2 * 12/2006 Hofmann ............. A43B 1/0009
                                                                    428/178

(Continued)

FOREIGN PATENT DOCUMENTS

JP         2004050642 A     2/2004
KR        101730311 B1     4/2017

OTHER PUBLICATIONS

International Search Report issued by ISA/EPO in connection with PCT/US2018/066035 dated Mar. 21, 2019.
Written Opinion issued by ISA/EPO in connection with PCT/US2018/066035 dated Mar. 21, 2019.

*Primary Examiner* — Vishal R Sahni
(74) *Attorney, Agent, or Firm* — Quarles & Brady LLP

(57) ABSTRACT

A cushioned load bearing seating surface includes a suspension layer, a membrane and a load distribution layer. The membrane is positioned between the suspension layer and the load distribution layer. The membrane includes a base and a plurality of molded, oriented, piston-like projections extending from the base. The membrane defines intermediate portions between each projection and the base that extend in a direction opposite the projections. The projections are compressible from a first state to a compressed state under load and return to the first state upon removing the load. The intermediate portions flex to accommodate at least a portion of the projections as the projections are compressed. A molded, piston pixelated membrane and a method for making the membrane are disclosed.

19 Claims, 10 Drawing Sheets

(51) Int. Cl.

| | | |
|---|---|---|
| *A47C 7/20* | (2006.01) | |
| *A47C 7/35* | (2006.01) | |
| *A47C 7/74* | (2006.01) | |
| *B60N 2/56* | (2006.01) | |
| *B60N 2/72* | (2006.01) | |
| B29L 31/00 | (2006.01) | |

(52) U.S. Cl.
CPC .................. *A47C 7/74* (2013.01); *B60N 2/56* (2013.01); *B60N 2/72* (2013.01); *B29L 2031/771* (2013.01)

(56) References Cited

U.S. PATENT DOCUMENTS

| | | |
|---|---|---|
| 7,441,758 B2 | 10/2008 | Coffield et al. |
| 9,055,782 B2 * | 6/2015 | McDonnell .......... A43B 1/0054 |
| 9,173,496 B2 | 11/2015 | Coffield et al. |
| 9,215,933 B2 | 12/2015 | Coffield et al. |
| 2007/0033832 A1 * | 2/2007 | Marvin ................ A43B 13/189 |
| | | 36/29 |
| 2008/0184600 A1 * | 8/2008 | Yang .................... A43B 1/0045 |
| | | 36/3 B |
| 2011/0138653 A1 * | 6/2011 | Corbett .................... A43B 7/08 |
| | | 36/29 |
| 2013/0326819 A1 * | 12/2013 | Wyman ................ A47C 27/053 |
| | | 5/738 |
| 2017/0035146 A1 | 2/2017 | Peyton |

\* cited by examiner

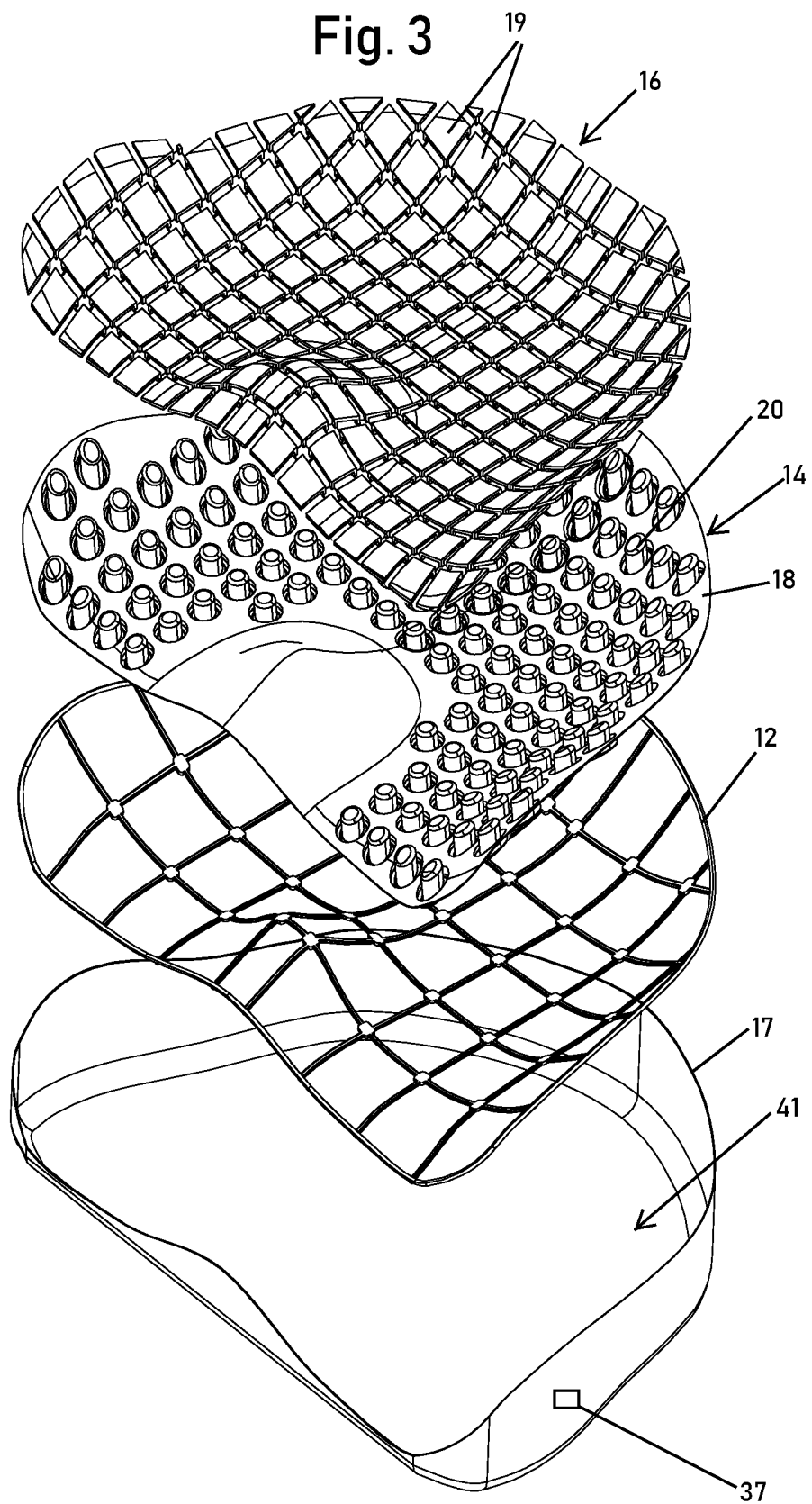

Fig. 8A
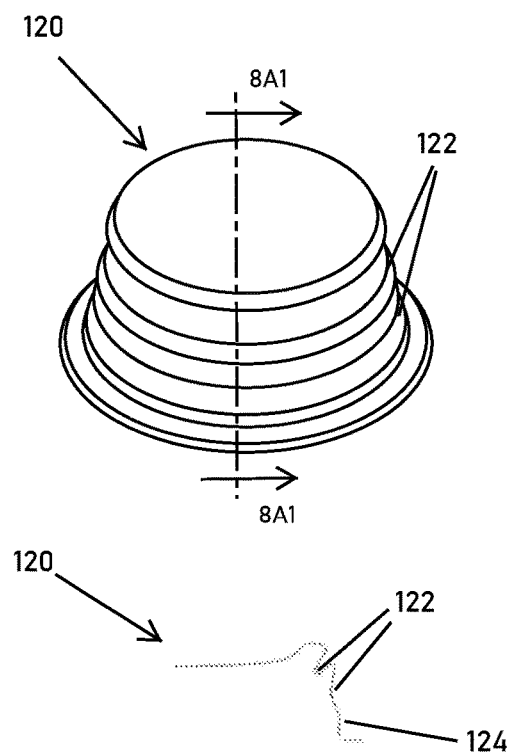
FIG. 8A1
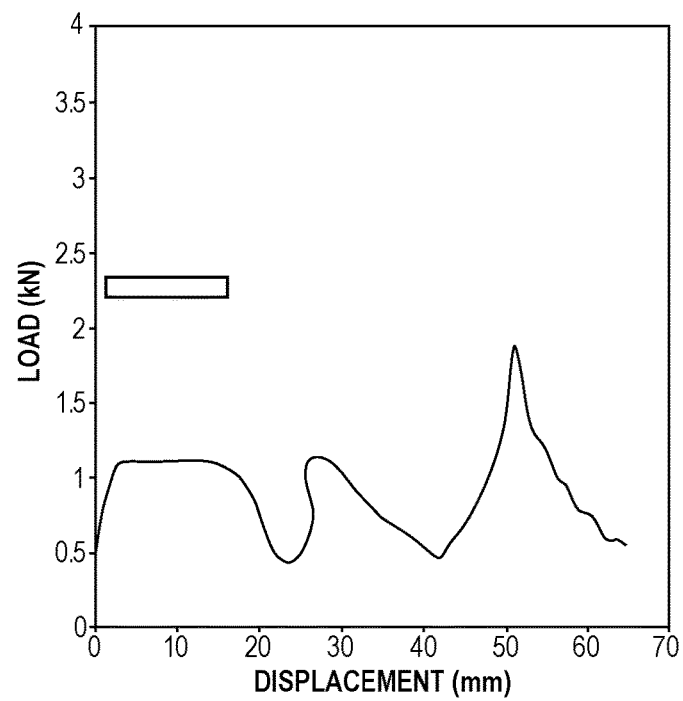

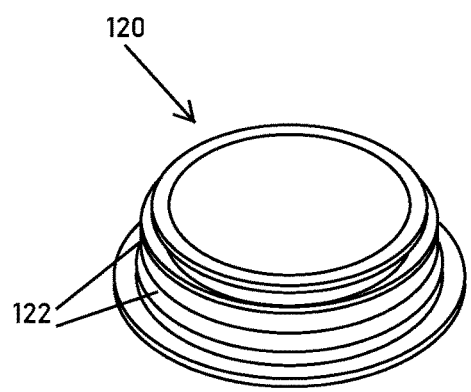
Fig. 8B
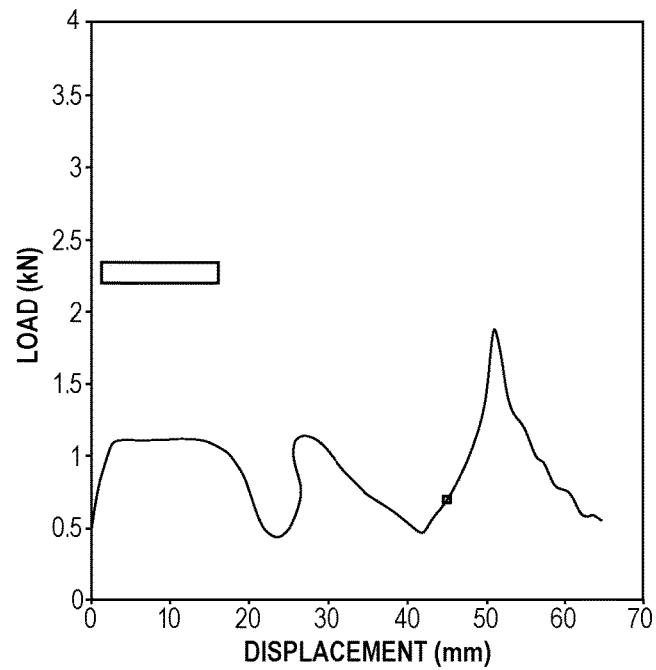

Fig. 8C
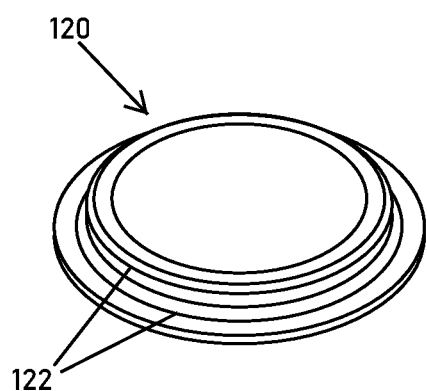
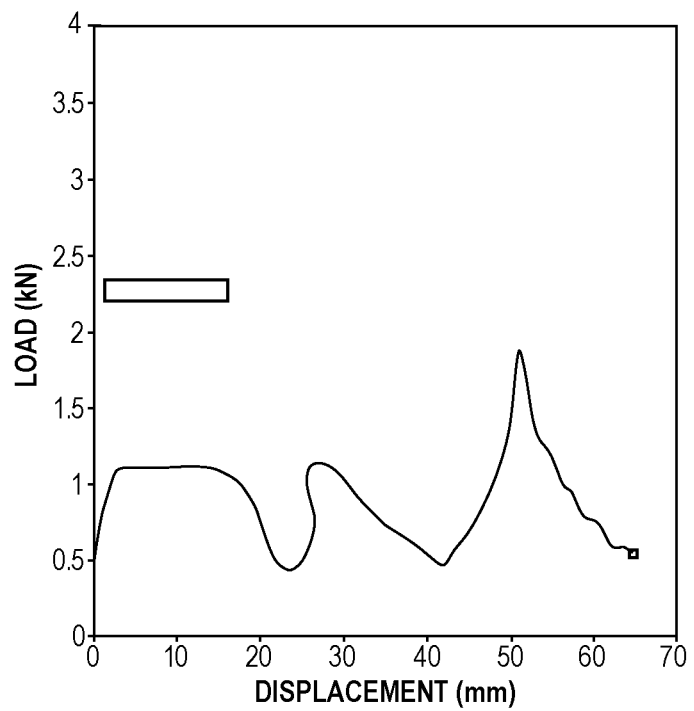

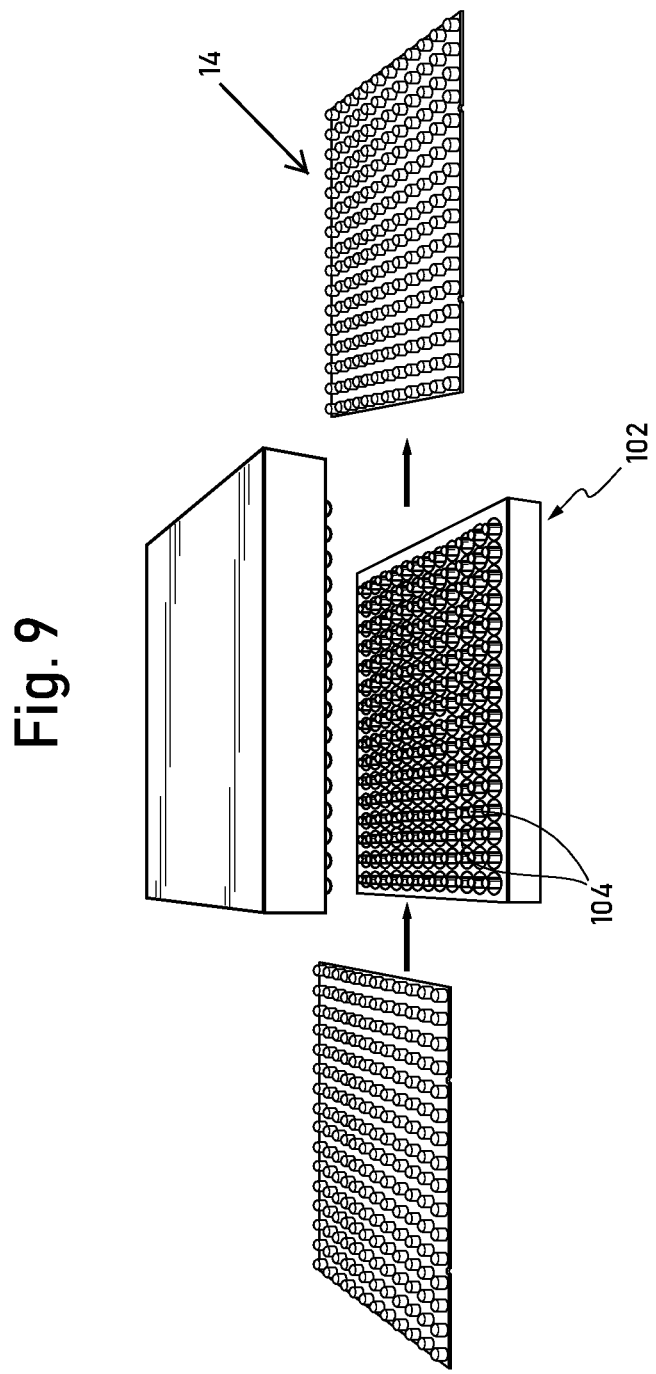

CUSHIONED LOAD BEARING SURFACE AND METHOD FOR MAKING SAME

CROSS-REFERENCE TO RELATED APPLICATION DATA

This application claims the benefit of and priority to Provisional U.S. Patent Application Ser. No. 62/599,137, filed Dec. 15, 2017, titled Cushioned Load bearing Surface and Method for Making Same, the disclosure of which is incorporated herein in its entirety.

BACKGROUND

The present invention relates to a cushioned load bearing surface, such as a seat bottom surface or the back of a chair or seat, and a method of making the surface.

There are continuing efforts to develop new and improved cushioned load bearing surfaces. A primary objective of these efforts is to obtain a durable, low mass and inexpensive load bearing surface. In the context of seating and other body-support applications, it is also important to address comfort issues. For example, with seating, it can be important to provide a surface that is comfortable and does not create body fatigue over periods of extended use. It is also important that a surface provides a comfortable environment by providing proper air flow and thermal properties. These structural or load characteristics as well as environmental characteristics will vary from application to application.

It is known to provide molded load bearing surfaces that are oriented after molding to provide desired load bearing surface or structural characteristics. For example, Coffield, et al., U.S. Pat. Nos. 9,215,933, 9,173,496, and 7,441,758, all entitled "Load Bearing Surface", commonly assigned with the present application and incorporated herein by reference in their entireties, disclose oriented load bearing surfaces that have proven to be a marked improvement over prior known surfaces in many ways. These surfaces include an elastomeric membrane that is oriented in only a single direction, for example, by compression or stretching to achieve the desired load support characteristics.

Seating for automotive and other applications utilizes steel suspensions covered by a closed cell or open cell foam, such as polyurethane to provide a comfortable, cushioned surface. Although foams address many needs in styling and force deflection compliance, they are typically formed in a two-part thermoset process that adds cost and time to produce such seating. In addition, foam is typically a single density or durometer. Occupant pressure maps show that forces across a seat surface should be variable and tunable to improve overall seat comfort; however, single density foams do not provide the desired tunability for seating comfort. As such, there are limits to seating design when foams are used.

Moreover, single durometer foams use shape to control comfort and variable reaction force requirements. Foam is inefficient in this application. First, seat packaging space is an issue when designing foam seats and, for example, in an automotive application, interior space is becoming more valuable as vehicles get smaller for maximum fuel efficiency. Second, styling is limited with foam designs in that a substantial amount of foam is needed to achieve the comfort levels desired and thick bulky seats result with foam up to 200 mm thick in some cases.

In addition, foam is a thermal insulator. For example, in automotive applications, cooling and heating foam requires a considerable amount of energy from vehicle electrical systems which affects fuel economy. This becomes an even greater consideration with the introduction of hybrid electric or all electric vehicles. Foam can also be difficult to fasten items to, such as wire harnesses, baffles, bellows and heating elements.

Accordingly, there is a need for a cushioned load bearing seating surface, such as a seat bottom or seat back, having load bearing characteristics that can be varied over the entire surface. That is, the reaction force across the surface can be almost continuously varied across the entire surface. Desirably, such a surface is variably and easily molded, is thin and lightweight with low insulative properties. More desirably still, such a surface permits air flow for heating, cooling and moisture control with minimal space requirements for seat heating and/or cooling elements.

SUMMARY

In one aspect, a cushioned load bearing seating surface includes a suspension layer, a membrane and a load distribution layer. The membrane is positioned between the suspension layer and the load distribution layer. The membrane includes a base and a plurality of molded, oriented, piston-like projections extending from the base, and defines intermediate portions between each projection and the base. The intermediate portions extend in a direction opposite of the projections.

The projections are compressible from a first state to a compressed state under load and return to the first state upon removal of the load. The intermediate portions flex to accommodate at least a portion of the projections as the projections are compressed.

In an embodiment, the membrane is formed from a polymeric material. At least a portion of the membrane at the intermediate portions is oriented. The portions of the projections adjacent to the intermediate portions can also be oriented. The portions of the projections adjacent the intermediate portions and the intermediate portions can be formed having a wall thickness that is less than the wall thickness of the other portions of the projections. In an embodiment, the intermediate portions have a U-shaped cross-section, such that the walls of the intermediate portions roll to accommodate compression of the projections.

The projections are formed independent of each other. The projections can have a wide variety of symmetrical shapes, for example, the projections can have a circular cross-section, a hexagonal, square or rectangular cross-section, they can be kidney shaped or oval, or have irregular shapes. The shapes and sizes of the projections can vary across the membrane.

In an embodiment of the seating surface, a space is defined between the membrane and the load distribution layer. The space can define an air manifold. The air manifold can be configured to draw vacuum in the space between the membrane and the load distribution layer and/or to accommodate a heated or cooled air flow. Heating and/or cooling elements can also be accommodated in the space between the membrane and the load distribution layer In an aspect, a molded piston pixelated membrane for a seat, includes a base and a plurality of molded, oriented, piston-like projections extending from the base. The membrane defines intermediate portions between each projection and the base that extend in a direction opposite of the projections.

The projections are compressible from a first, relaxed state to a compressed state under load and return to the relaxed state upon removal of the load. The intermediate portions flex or roll (having a rolling radius) to accommodate at least a portion of the projections as the projections are compressed. At least a portion of the membrane at the intermediate portions is oriented. In an embodiment, the portions of the projections adjacent the intermediate portions and the intermediate portions are oriented. The projections are formed independent of each other.

The membrane can be formed such that the portions of the projections adjacent the intermediate portions and the intermediate portions are formed having a wall thickness less than a wall thickness of the other portions of the projections.

In an embodiment, the portions of the projections adjacent the intermediate portions and the intermediate portions are selectively oriented to a degree different than the remaining portions of the projection. These portions can be oriented to a greater degree than the remaining portions of the projection.

A method for making a molded, piston pixelated membrane includes providing a membrane formed from a polymeric material, the membrane having a base, a plurality of piston-like projections extending from the base and defining intermediate portions between each projection and the base, securing the membrane in a mold and orienting a portion of the projections adjacent the intermediate portions and the intermediate portions. In a method, the step of orienting the portion of the projections adjacent the intermediate portions and the intermediate portions includes applying tension to the portion of the projections adjacent the intermediate portions and the intermediate portions.

The method can also include the step of heating the portion of the projections adjacent the intermediate portions and the intermediate portions during orienting. The membrane can also be oriented prior to orienting the portion of the projections adjacent the intermediate portions and the intermediate portions.

These and other features and advantages of the present device will be apparent from the following description, taken in conjunction with the accompanying sheets of drawings, and in conjunction with the appended claims.

BRIEF DESCRIPTION OF THE DRAWINGS

The benefits and advantages of the present embodiments will become more readily apparent to those of ordinary skill in the relevant art after reviewing the following detailed description and accompanying drawings, wherein:

FIG. 3 is an exploded view of the cushioned load bearing surface of FIG. 1;

FIGS. 8A, 8A1, 8B, 8C and illustrate another embodiment of the membrane projection and show the load on the projection in kilonewtons (kN) versus displacement or movement of the projection; FIG. 8A1 being a partial cross-sectional view of the projection of FIG. 8A through line 8A1-8A1 of FIG. 8A; and FIG. 9 is a graphic illustration of an embodiment of a pixelated membrane shown with a press mold for orienting the projections or piston elements.

DETAILED DESCRIPTION

Figure 1:
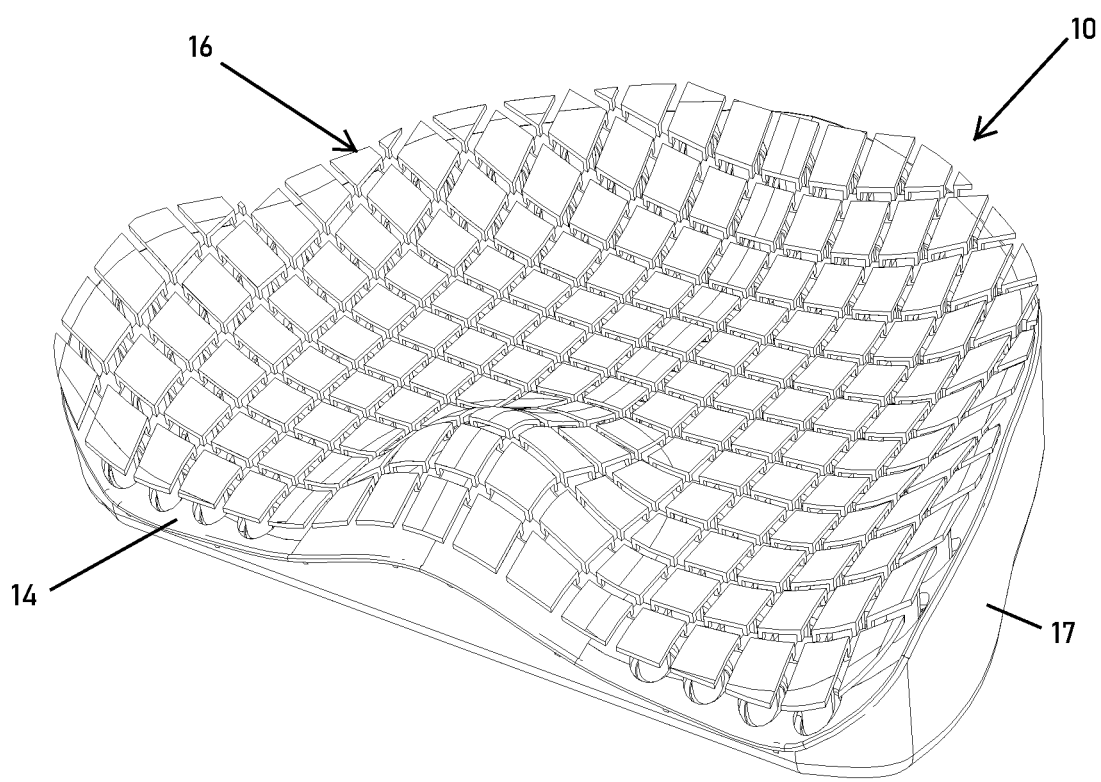
FIG. 1 is an illustration of an embodiment of a cushioned load bearing seating surface.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2A:
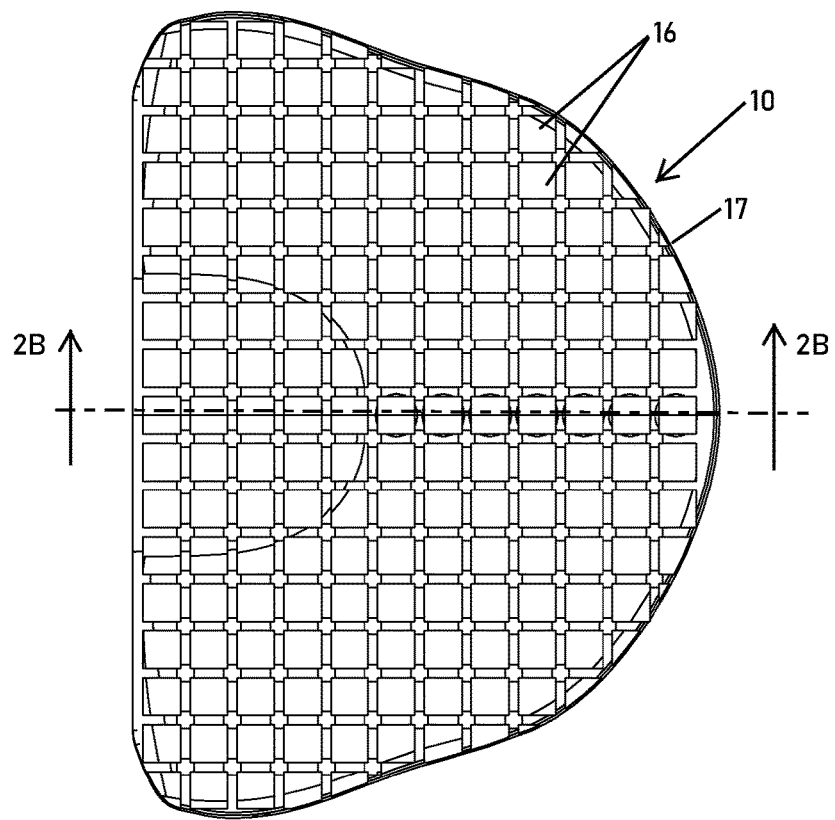
FIG. 2A is a top view of the cushioned load bearing surface of FIG. 1.

Referring to the figures and in particular to FIGS. 1-3, there is shown an embodiment of a cushioned load bearing seating surface 10, such as a seat bottom or seat back. The seating surface 10 can include a suspension member or layer 12, an oriented, piston pixelated membrane 14 and a load distribution member or layer 16. In practice, the seating surface 10 may include a seat frame 17 and/or more or less layers. FIG. 2 is a cross-section of the seat 10 and FIG. 3 is an exploded view of the seat 10.

Figure 7:
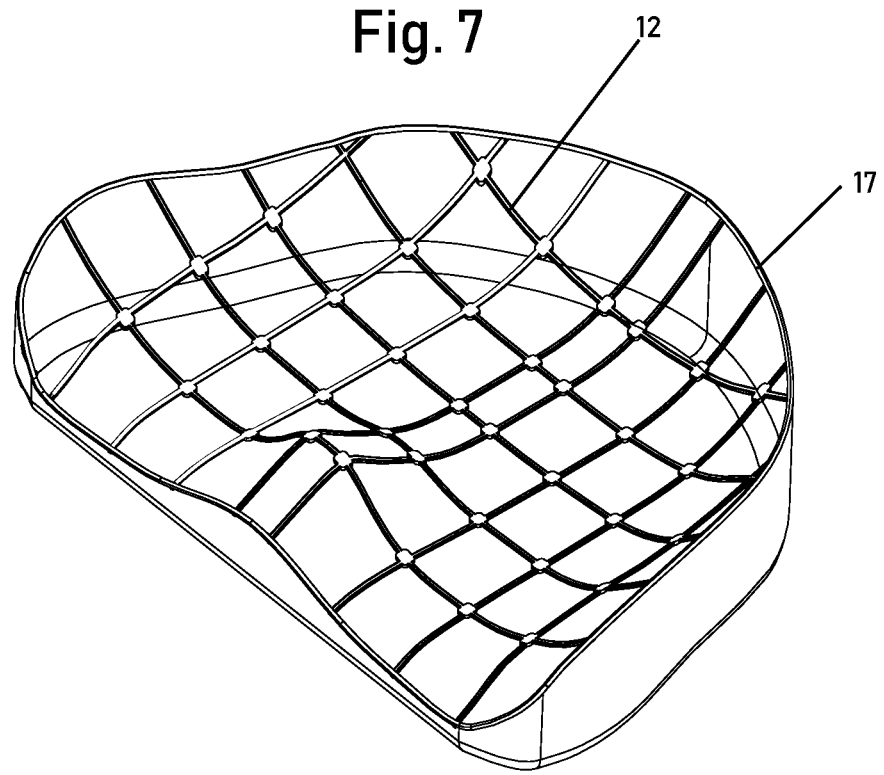
FIG. 7 is a perspective view of the suspension layer and seat frame.

The suspension layer 12 is of a known type and can be, for example an oriented membrane such as that disclosed in Coffield et al., U.S. Pat. No. 9,215,933, commonly assigned with the present application and incorporated herein by reference. One suitable material for the suspension layer 12 is an elastomer, such as a copolyester elastomer, for example, EM400, commercially available from DSM of Troy, Mich. As illustrated in FIG. 7, the suspension layer 12 can be mounted to the seat frame 17 along an edge 21 of the frame 17.

The load distribution member or layer 16 provides the surface on which the occupant sits or leans. It can be formed from a wide variety of materials, such as a thermoplastic elastomer (also referred to as thermoplastic rubber), for example, a thermoplastic vulcanizate. Other suitable materials may include thermoplastic elastomers, EPDM (ethylene propylene diene monomer (M-class) rubber) encapsulated in a polypropylene (PP) matrix, and other like materials, as will be recognized by those skilled in the art. The load distribution layer 16 provides a smooth or relatively smooth surface on which to sit or lean and prevents the penetration of, for example, springs or other protruding objects that may be used in fabricating the seating surface 10.

Figure 6A:
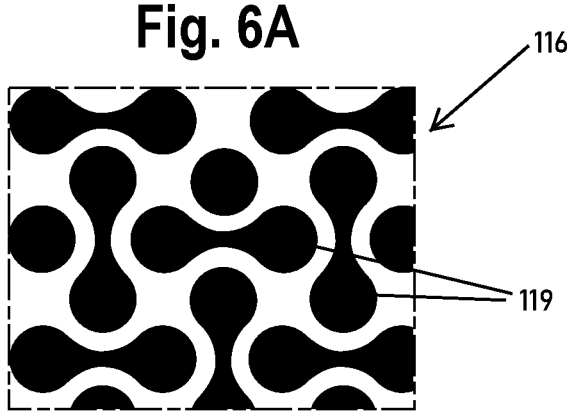
FIGS. 6A-6C are illustrations of various configurations of the load distribution layer.
Figure 6B:
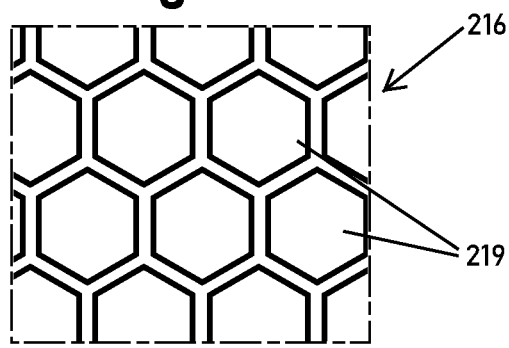
Figure 6C:
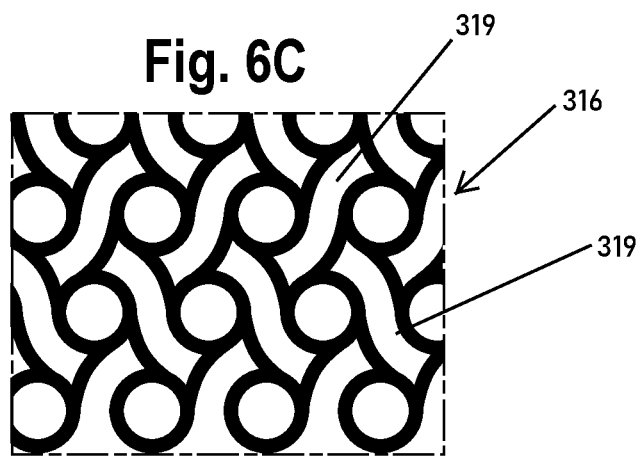

The load distribution layer 16 illustrated in FIGS. 1 and 3 is formed from a series of rectangular or substantially rectangular elements 19 that are interconnected with adjacent elements 19. Referring briefly to FIG. 6A-6C, layers 116, 216, 316 can be formed from a series of interconnected elements 119 having a figure 8-like shape, as illustrated in FIG. 6A, a series of interconnected elements 219 having a hexagonal shape, as illustrated in FIG. 6B, a series of interconnected elements 319 having an S-like shape as illustrated in FIG. 6C, or any other suitable shape as will be appreciated by those skilled in the art.

Figure 2B:
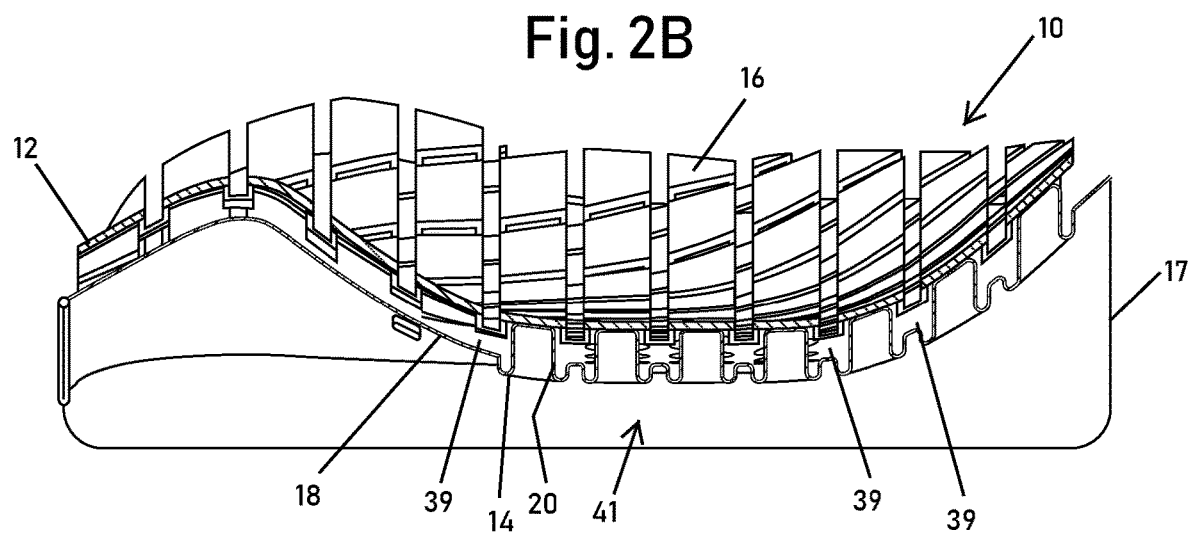
FIG. 2B is a cross-sectional view taken along line 2B-2B of FIG. 2A.
Figure 4A:
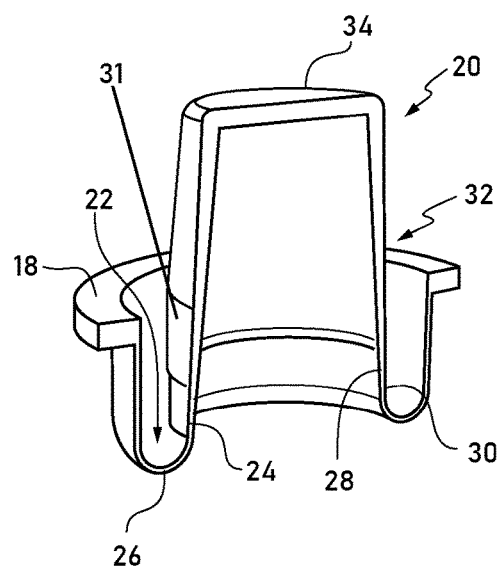
FIGS. 4A and 4B are sectional illustrations of a single membrane projection or piston element in a molded and relaxed state in FIG. 4A and showing the movement of the projection when subjected to a load in FIG. 4B.
Figure 4B:
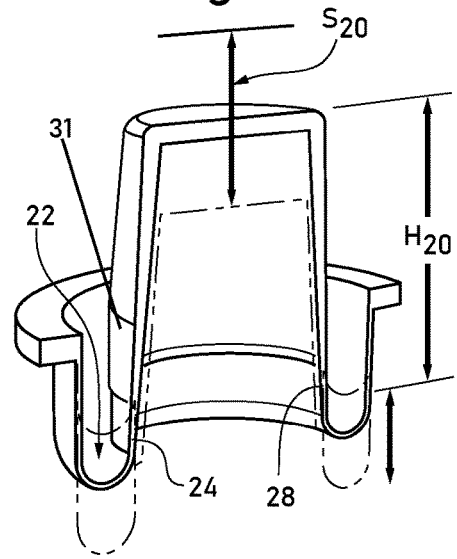

An embodiment of an oriented, piston pixelated membrane or layer 14 is illustrated in FIGS. 2B and 3. The membrane 14 includes a base 18 and a series of molded, oriented piston-like projections 20 extending from the base 18. Viewed another way, the base 18 includes a series of inverted cup-like formations formed in base 18. Referring to FIGS. 4A and 4B, an intermediate portion 22 between the projection 20 and the base 18 is formed having a U-shaped cross-section, as indicated at 24, that extends in a direction opposite of the projection 20.

As seen in FIG. 4B, the intermediate portion 22 provides a spring-like transition and rolls (having a rolling radius, as indicated at 26) to allow the projections 20 to compress toward the base 18 as a load is applied to the layer 14. Compression of the projections 20 is accommodated by the rolling intermediate portion 22, although a portion of the projections 20 may deform during compression. However, because of the polymeric material used to form the oriented, piston pixelated membrane 14, the projections 20 will return to their pre-compressed state when the load is removed. The projections 20 are formed independent of each other so that each projection 20 can be compressed independently.

In an embodiment, a lower portion 28 of the projection 20 wall and the intermediate portion 22 are thinned (as indicated at 30) relative to the upper portion 32 of the projection 20 and the base 18. The thinned portions 30 provide for proper rolling of the intermediate portions 22 and the projection lower portions 28, as the projections 20 are compressed. In an embodiment, the piston pixelated layer 14 or portions of the layer 14 are oriented following molding to provide the desired load bearing characteristics to the layer 14, generally, and specifically to the projections 20 and the intermediate portions 22, and to provide the desired thickness (or thinness as at 30) to the lower portions 28 and intermediate portions 22 as illustrated in FIG. 4B. While FIG. 4B may not be to scale, it shows the relative thicknesses of the projection upper portion wall 32 to the lower portion wall 28 and intermediate portion 22. Thinning or necking down the side walls 31 of the projections 20 and the intermediate portion 22 also allows for better control of the degree of orientation, or selective orientation of the lower portion 28 and intermediate portion 22 walls.

In an embodiment in which it is desired to achieve seat compliance pressures of about 0.5 to 20 psi, the projection lower portion 28 has a thickness of about 0.5 to 1.5 mm. Walls of this thickness will roll in the rolling radius 26 or intermediate portion 22 and thus enable a face 34 of the projection 20 to move during loading as an occupant sits in the seat 10. Rolling refers to the movement of the lower portion 28 of the projection 20 toward and into the rolling radius 26 as the projection is compressed, for example, as shown by the dashed lines in FIG. 4B. It will be appreciated that as the projection 20 is compressed the height $H_{20}$ of the projection is reduced and the lower portion 28 moves toward and into the rolling radius 26.

Although the projections 20 are shown as having a circular cross-section, the one or more projections 20 can take many shapes, such as hexagonal, square, rectangular, kidney shaped, oval, irregular shapes and the like. The shapes and sizes of the projections 20 as formed can vary across the layer 14, and the projections 20 can be symmetrical or asymmetrical. The tops or faces 34 of the projections 20 can be planar with and relative to a plane $P_{18}$ defined by the base 18 or they can be angled relative to the base plane $P_{18}$.

For example, referring briefly to FIGS. 8A-8C there is shown another embodiment of the projection 120. Rather than a rolling action when compressed, the projection 120 has a series of fold lines 122 (see, for example, FIG. 8A1) along which the projection walls 124 will fold onto each other to allow compression of the projection 120. A load vs. displacement graph next to the projections 120 illustrated in FIGS. 8A-8C shows the displacement in millimeters (mm) of the projection 120 as a load in kilo Newtons (kN) is applied to the projection 120.

Referring again to FIGS. 4A and 4B, the projection height $H_{20}$ and stroke $S_{20}$, that is the amount of travel of the projection 20 during loading, can be configured for a given load, so as to eliminate "hammocking" of known suspension seats. Hammocking occurs when a suspension seat has a narrow load in the center of the suspension and may cause discomfort because the hard perimeter frame and high-pressure points in the suspension may be felt by the occupant. The piston pixelated layer 14, positioned over the suspension layer 12 can be designed to compensate for hammocking by tuning each projection or piston 20 individually, thus compensating the stroke $H_{20}$ and reaction force for each projection. For example, the projections 20 in the center of the seating surface 10 can be configured to compress less than those at the periphery of the seating surface.

In an embodiment, the piston pixelated layer 14 may be a solid layer that is impermeable to fluids and gases. The area 36 above the piston pixelated layer 14 and between the projections 20 defines voids as indicated at 39 in FIG. 2B, that can be configured as an air manifold to assist drawing vacuum, for example, using a fan (not shown) to draw moisture from the occupant's skin to cool the occupant. Heating can also be provided by, for example, a forced hot air system or heat pump system (not shown). In addition, the area between the projections 36 can be designed to accommodate electrical heating elements (not shown) to heat the seat during cooler weather or cooling elements (not shown) to cool the seat during warmer weather.

Seat comfort adjustment can be controlled using air pressure on the underside of the piston pixelated layer 14 in the area indicated generally at 41 in FIGS. 2B and 3. Pressure can be controlled and confined to specific projections 20 using, for example, partitions (not shown) on the underside of the layer 14, between the layer 14 and the frame 17. In one example based on seat pressure map studies, predetermined zones in central areas of the seat 10 have a higher air pressure than areas around the seat perimeter that are provided with a lower pressure. Air pressure can be supplied by a pressure pump (not shown) or can be applied by the weight of the occupant. Pressure that is increased by the weight of the occupant can be slowly vented as needed to reach the occupant's preferred comfort level. A valve 37 positioned, for example, on the seat frame 17 can be actuated to allow air to be discharged from the underside of the layer 14 (between the layer 14 and the frame 17) to allow the seat 10 to conform to the shape and size of the seat occupant. The valve 37 can be configured to allow air to return to the underside of the layer 14 when the seat is no longer occupied.

Figure 5A:
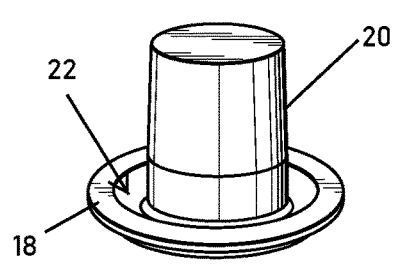
FIGS. 5A-5C are illustrations of the molding and orientation of a single membrane projection in which, in FIG. 5A, the projection is shown as molded, in FIG. 5B, the projection is undergoing orientation by stretching, and in FIG. 5C, the projection is formed and oriented by stretching.

Referring to FIGS. 5A-5C and 9, in a method of making the oriented, piston pixelated layer 14, the membrane is formed, by injection molding. The membrane 14 is formed having a base 18 and a series of projections 20, one such projection being shown in FIGS. 5A-5C. As formed, the membrane 14 includes the base 18 and the projection 20, and the intermediate portion 22 between the base 18 and the projection 20. As illustrated in FIG. 5A, the intermediate portion 22 can be formed having a shallow U-shaped cross-section (as seen at 24 in FIG. 4A). In other embodiments, the intermediate portions 22 may be formed having any suitable cross-sectional shape.

Following injection molding, the entire membrane 14 may be oriented, as by applying a stress, for example, tension or compression, as disclosed in the aforementioned patent to Coffield et. al., U.S. Pat. No. 9,215,933. Orienting the membrane 14 by stress can be performed at elevated temperatures and for a predetermined period of time to condition the membrane 14 to, for example, assure that the entirety of the membrane 14 has been subjected to and maintained at the elevated temperature. Conditioning the membrane assures that the membrane 14 retains its load bearing characteristics when subjected to elevated temperatures during use.

Figure 5B:
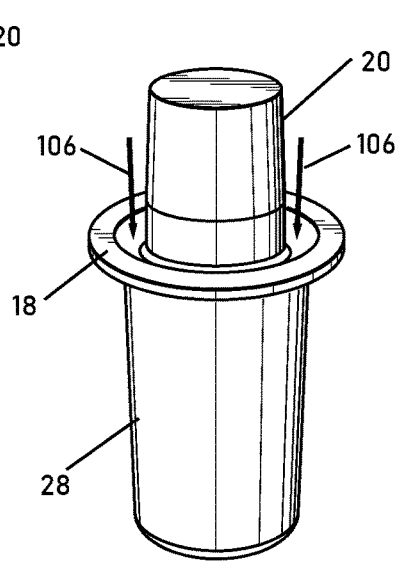
Figure 5C:
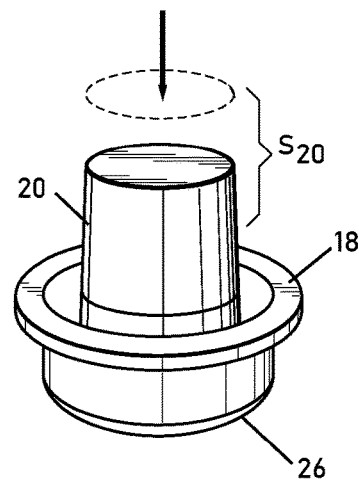

Portions of the projections 20, for example, the lower portions 28 and the intermediate portions 22 may be oriented and thinned, as by applying tension, for example, by stretching the lower portions 28 of the projections 20 and/or the intermediate regions 22. Referring to FIG. 5B, the lower portions 28 of the projections 20 and/or the intermediate regions 22 can be oriented by securing the membrane 14 in a device, for example a press mold 102, an example of which is illustrated in FIG. 9 and applying a force on the projection 20, for example by inserting a mandrel 104 into the inside of the projection 20 and stretching the lower portion 28 and the intermediate portion 22 in the direction indicated by the arrows at 106. Stretching the intermediate and lower wall portions 22, 28 thins and orients the wall portions 22, 28 and as such, elongates the U-shaped cross-section which, after stretching is as illustrated in FIG. 5C. The example press mold 102 and mandrel 104 illustrated in FIG. 9 can be configured to orient different portions of the membrane 14, e.g., different portions of the projections 20 and intermediate portions 22, to different degrees.

It has been found that orientating at least the lower wall portion 28 and the intermediate portion 22 increases the tensile yield strength and resin elongation that is desirable for rolling radius 26 action during stroke (compression of the projections 20 during use), increases creep resistance, and thins the wall of the lower wall 28 and intermediate portions 22 to facilitate the rolling action and to achieve projection 20 load targets. It will be appreciated that the end use geometry and the projections' 20 stroke or travel $S_{20}$ provides compliance comfort for the occupant.

It will also be appreciated that a number of benefits can be realized from the present cushioned load bearing surface 10 and method. One such benefit is that comfort can be achieved from both the shape of the part, that is the shape of the seat back or seat bottom, and the compliance of the various seat surface layers 12, 14, 16 without using conventional materials such as foams. Moreover, the present cushioned load bearing surface 10 allows for dynamic adjustment in compliance, e.g., compression of the projections 20, at a nodal or pixelated resolution. Further, both projection stroke $S_{20}$ and reaction force can be controlled using part designs, orientation processing and product air pressure.

Other benefits and advantages include adjustable seat surface comfort, again, without using foam materials. Moreover, the design is adjustable; that is, the reaction force can be adjusted for comfort needs through tunable projection element spacing, projection face sizes and shapes. Because the layer itself is formed from a flexible elastomer, such as a copolyester elastomer, the layer is able to follow the contour of the seat.

As noted above, the seat is breathable, offering little thermal insulation value (R value), provides a controlled air flow layer for seat cooling and space to accommodate seat heating and/or cooling elements. Because the surface is continuous and without holes, air pressure can be maintained under the seat, and as such, the piston pixelated layer can be adjustable for different body sizes, weights and positions using minimum packaging spaces, that is in a minimized size, for improved seating integration. The piston or projection 20 stroke and reaction force can be controlled by managing the air pressure in the space 41 between the membrane 14 and the frame 17 as a whole, or in part (e.g., in zones) using partitions in the space 41, as can be determined by, for example, pressure mapping studies while under occupant loading.

In the present disclosure, unless otherwise noted, all percentages (%) are percent by weight as appropriate. In addition, the words "a" or "an" are to be taken to include both the singular and the plural. Conversely, any reference to plural items shall, where appropriate, include the singular. It will be appreciated by those skilled in the art that the relative directional terms such as upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

From the foregoing it will be observed that numerous modification and variations can be effectuated without departing from the true spirit and scope of the novel concepts of the present film. It is to be understood that no limitation with respect to the specific embodiments illustrated is intended or should be inferred. The disclosure is intended to cover by the appended claims all such modifications as fall within the scope of the claims.

The invention claimed is:

1. A cushioned load bearing surface, comprising:
   a suspension layer;
   a membrane; and
   a load distribution layer, the membrane positioned between the suspension layer and the load distribution layer,
   wherein the membrane includes a base and a plurality of molded, oriented, piston-like projections each of the projections extending from the base, the membrane defining intermediate portions between each projection and the base that extend from the base in a direction opposite of the projections, the projections being compressible from a first state to a compressed state under load and returning to the first state upon removal of the load,
   wherein each of the intermediate portions circumscribes one of the projections such that the intermediate portion is an annular, thinned wall, the intermediate portion having a partial vertical cross-section that defines a U-shape with a concave side and a convex side, the concave side opening toward the projection, and the convex side facing away from the projection, and
   wherein the intermediate portions are configured to roll to accommodate at least a portion of the projections as the projections are compressed.

2. The surface of claim 1, wherein the membrane is formed from a polymeric material and wherein at least a portion of the membrane at the intermediate portions is oriented.

3. The surface of claim 2, wherein a portion of the projections adjacent the intermediate portions is oriented.

4. The surface of claim 3, wherein the portions of the projections adjacent the intermediate portions and the intermediate portions are formed having a wall thickness less than a wall thickness of the other portions of the projections.

5. The surface of claim 1, wherein the projections are formed independent of each other.

6. The surface of claim 1, wherein the projections have a circular cross-section.

7. The surface of claim 1, wherein a space between the membrane and the load distribution layer defines an air manifold.

8. The surface of claim 7, wherein the air manifold is configured to draw vacuum in the space between the membrane and the load distribution layer and/or to accommodate a heated or cooled air flow.

9. A molded, piston pixelated membrane for a cushioned load bearing seat, comprising a base and a plurality of molded, oriented, piston-like projections, each of the projections extending from the base in a first direction, the membrane defining intermediate portions between each projection and the base, each intermediate portion including an annular, thinned wall circumscribing one of the plurality of projections, the annular, thinned wall extending from the base in a second direction opposite the first direction to a rolling radius and extending from the rolling radius in the first direction to the projection such that the annular, thinned wall is contiguous with the projection, the projections being compressible from a first state to a compressed state under load and returning to the first state upon removal of the load,
wherein the intermediate portions are configured to roll to accommodate at least a portion of the projections as the projections are compressed, and
wherein at least a portion of the membrane at the intermediate portions is oriented.

10. The membrane of claim 9, wherein the projections are formed independent of each other.

11. The membrane of claim 9, wherein the portions of the projections adjacent the intermediate portions and the intermediate portions are formed having a wall thickness less than a wall thickness of the other portions of the projections.

12. The membrane of claim 9, wherein the rolling radius is configured to accommodate compression of the projections.

13. The membrane of claim 9, wherein the projections have a circular cross-section.

14. The membrane of claim 9, wherein the portions of the projections adjacent the intermediate portions and the intermediate portions are selectively oriented to a degree different than the remaining portions of the projection.

15. The membrane of claim 14, wherein the portions of the projections adjacent the intermediate portions and the intermediate portions are oriented to a degree greater than the remaining portions of the projection.

16. A method for making a molded, piston pixelated membrane, comprising:
providing a membrane formed from a polymeric material, the membrane having a base, a plurality of piston-like projections, each of the projections extending from the base in a first direction, the membrane defining intermediate portions between each projection and the base, each of the intermediate portions being a thinned wall that circumscribes one of the plurality of projections and extends from the base in a second direction, the second direction being opposite of the first direction, the intermediate portions each having a concave side that opens toward the first direction;
securing the membrane in a mold; and
orienting a portion of the projections adjacent the intermediate portions and orienting the intermediate portions,
wherein the intermediate portions are configured to roll to accommodate at least a portion of the projections as the projections are compressed.

17. The method of claim 16, wherein the step of orienting the portion of the projections adjacent the intermediate portions and orienting the intermediate portions includes applying tension to the portion of the projections adjacent the intermediate portions and applying tension to the intermediate portions.

18. The method of claim 17 including the step of heating the portion of the projections adjacent the intermediate portions and heating the intermediate portions during orienting.

19. The method of claim 16 including the step of orienting the membrane prior to the step of orienting the portion of the projections adjacent the intermediate portions and orienting the intermediate portions.

* * * * *